United States Patent [19]

Lagarde et al.

[11] Patent Number: 5,761,663

[45] Date of Patent: Jun. 2, 1998

[54] METHOD FOR DISTRIBUTED TASK FULFILLMENT OF WEB BROWSER REQUESTS

[75] Inventors: Konrad Charles Lagarde, Milford, Conn.; Richard Michael Rogers, Beacon, N.Y.

[73] Assignee: International Business Machines Corporation, Armonk, N.Y.

[21] Appl. No.: 856,886

[22] Filed: May 15, 1997

Related U.S. Application Data

[62] Division of Ser. No. 474,572, Jun. 7, 1995, Pat. No. 5,710,918.

[51] Int. Cl.$^6$ .................................................. G06F 17/30

[52] U.S. Cl. .................... 707/10; 707/3; 395/200.32; 395/200.33

[58] Field of Search ........................... 707/1, 3, 10, 101; 395/200.32, 200.33

[56] References Cited

U.S. PATENT DOCUMENTS 5,572,565  11/1996  Judson ........................ 395/200.48
5,649,186   7/1997  Ferguson ............................ 707/10
5,659,729   8/1997  Nielsen ............................... 707/3
5,668,988   9/1997  Chen et al. ....................... 707/101

Primary Examiner—Paul R. Lintz
Attorney, Agent, or Firm—Lynn L. Augspurger

[57] ABSTRACT

A World Wide Web browser makes requests to web servers on a network which receive and fulfill requests as an agent of the browser client, organizing distributed sub-agents as distributed integration solution (DIS) servers on an intranet network supporting the web server which also has an access agent servers accessible over the Internet. DIS servers execute selected capsule objects which perform programmable functions upon a received command from a web server control program agent for retrieving, from a database gateway coupled to a plurality of database resources upon a single request made from a Hypertext document, requested information from multiple data bases located at different types of databases geograhically dispersed, performing calculations, formatting, and other services prior to reporting to the web browser or to other locations, in a selected format, as in a display, fax, printer, and to customer installations or to TV video subscribers, with account tracking.

34 Claims, 9 Drawing Sheets

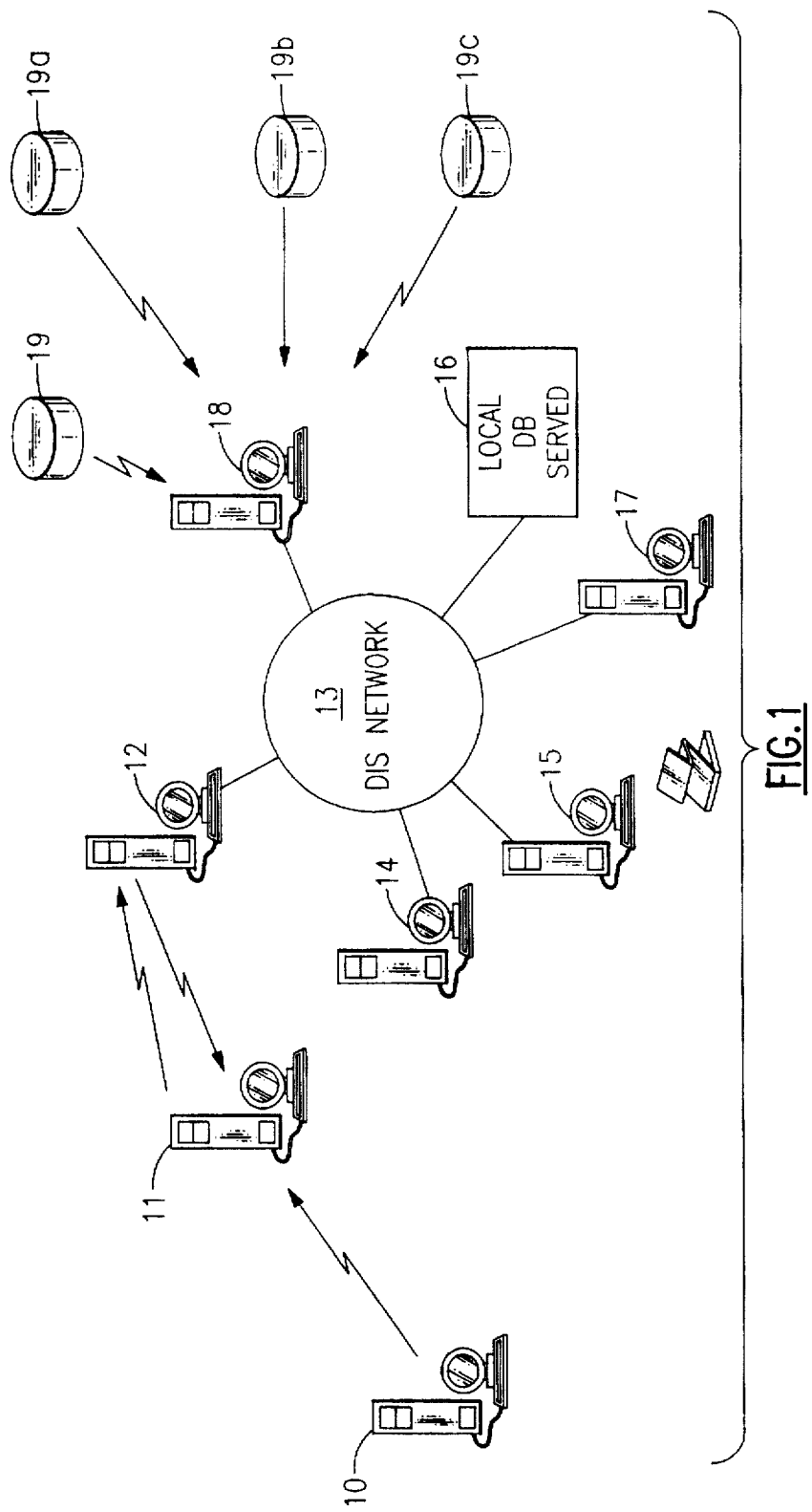

WELCOME TO THE HOMEPAGE OF....

THE CURRENT DATE IS FRI APR 28 11:05:38 1995

THIS PAGE IS UNDER DEVELOPMENT! (C)COPYRIGHT IBM CORPORATION, 1994, 1995. ALL RIGHTS RESERVED.

"WE'RE COMING TO LIVE FROM THE ON-RAMP TO THE INFORMATION SUPER HIGHWAY." THIS IS THE IBM U.S. HIGHER EDUCATION HOME PAGE ON THE WORLD WIDE WEB.

BY ACCESSING THIS PAGE YOU WILL HAVE THE UNIQUE CAPABILITY OF OBTAINING INTERACTIVE INFORMATION RELATING TO OUR BUSINESS. BY MERELY CLICKING ON THE HIGHLIGHTED TEXT AND FOLLOWING THE ROAD-SIGNS YOU'LL BE WELL ON YOUR WAY TO INFOCENTRIC CITY!!

MAKE YOUR SELCTION BELOW

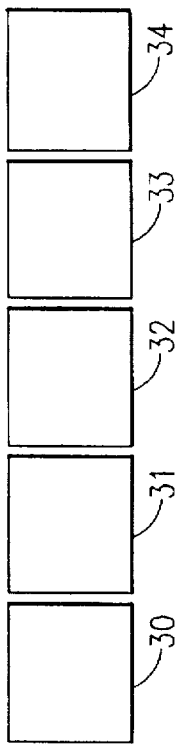

FIG.2

FILE NAME IS P81484. ← 43

44 {
CATCH IT ON THE NET!
YOU JUST RAN A DATA INTERPRETATION SYSTEM CAPSULE!
THE OUTPUT IS THE TEXT TOOL TRANSFERRED AS A TEXT.
COPYRIGHT IBM 1995
}

CUSTOMERS WHO MIGHT WANT TO KNOW ABOUT THE
DIS WWW GATEWAY---THIS DATA IS FROM THE IBM MARKET PLANNING DATA SYSTEM--
A DB2 MVS DATABASE
----------------------------------

| CUSTOMER NAME | SW DESCRIPTION | INST | CITY STATE |
|---|---|---|---|
| AC NIELSEN CO | DIS 1.3.6 DIS ENTERPRISE SE | 9501 | CHERRY HILL NJ |
| AC NIELSEN CO | DIS 1.3.6 DIS ENTERPRISE SE | 9501 | GREEN BAY WI |
| AC NIELSEN CO | DIS 1.3.6 DIS ENTERPRISE SE | 9501 | MINNEAPOLIS MN |
| AC NIELSEN CO | DIS 1.3.6 DIS ENTERPRISE SE | 9501 | WILTON CT |
| ADVANTIS | DIS 1.3.6 DIS ENTERPRISE SE | 9501 | SCHAUMBURG IL |
| ALTA BATES MEDI | DIS 1.3.6 DIS ENTERPRISE SE | 9410 | BERKELEY CA |
| ALTA BATES MEDI | DIS 1.3.6 DIS ENTERPRISE SE | 9503 | BERKELEY CA |
| AMERICAN PRESID | DIS 1.3.6 DIS ENTERPRISE SE | 9501 | OAKLAND CA |
| ANHEUSER BUSCH | DIS 1.3.6 DIS ENTERPRISE SE | 9501 | ST LOUIS MO |
| ANHEUSER BUSCH | DIS 2.0 OPENDIS ACCESS SERV | 9501 | ST LOUIS MO |
| ASHLAND OIL INC | DIS 1.3.6 DIS ENTERPRISE SE | 9502 | LEXINGTON KY |
| ASHLAND OIL INC | DIS 2.0 OPENDIS ACCESS SERV | 9502 | LEXINGTON KY |
| BELLSOUTH CELLU | DIS 1.3.6 DIS ENTERPRISE SE | 9501 | FT LAUDERDALE FL |
| BELLSOUTH CELLU | DIS 2.0 OPENDIS ACCESS SERV | 9501 | FT LAUDERDALE FL |
| BELLSOUTH COMMU | DIS 1.3.6 DIS ENTERPRISE SE | 9501 | ATLANTA GA |
| BELLSOUTH COMMU | DIS 1.3.6 DIS ENTERPRISE SE | 9501 | BIRMINGHAM AL |
| BELLSOUTH TELEC | DIS 1.3.6 DIS ENTERPRISE SE | 9501 | ATLANTA GA |
| BRIO TECHNOLOGY | DIS 1.3.6 DIS ENTERPRISE SE | 9501 | MOUNTAIN VIEW CA |
| BRISTOL MYERS S | DIS 1.3.6 DIS ENTERPRISE SE | 9410 | PLAINSBORO NJ |
| BRISTOL MYERS S | DIS 2.0 OPENDIS ACCESS SERV | 9502 | NEW YORK NY |
| BROADWAY DEPT S | DIS 1.3.6 DIS ENTERPRISE SE | 9410 | LOS ANGELES CA |
| BROOLYN UNION | DIS 1.3.6 DIS ENTERPRISE SE | 9410 | BROOKLYN NY |
| CHESEBROUGH PON | DIS 1.3.6 DIS ENTERPRISE SE | 9501 | GREENWICH CT |
| COLGATE-PALMOLI | DIS 1.3.6 DIS ENTERPRISE SE | 9410 | IRVINE CA |
| COLGATE-PALMOLI | DIS 1.3.6 DIS ENTERPRISE SE | 9410 | MORRISTOWN NJ |
| COLGATE-PALMOLI | DIS 1.3.6 DIS ENTERPRISE SE | 9410 | NEW YORK NY |

FIG.4

SELECT THE BUE BELOW

40A { BY MAKING YOUR SELECTION, YOU WILL EXECUTE A DIS CAPSULE THAT PULLS SALES RESULTS FOR YTD CATALOG REVENUE.

41—[SULLIVAN]  [SUBMIT REQUEST]—42

FILE NAME IS P555119. ←—59

CATCH IT ON THE NET!

61 { YOU JUST RAN A DATA INTERPRETATION SYSTEM CAPSULE! THE OUTPUT IS THE PLOT TOOL TRANSFERRED AS A BITMAP.
COPYRIGHT IBM 1995

METHOD FOR DISTRIBUTED TASK FULFILLMENT OF WEB BROWSER REQUESTS

This application is a division of the application entitled, "METHOD FOR DISTRIBUTED TASK FULFILLMENT OF WEB BROWSER REQUESTS", U.S. Ser. No. 08/474,572, filed Jun. 7, 1995, now U.S. Pat. No. 5,710,918.

COPYRIGHT AUTHORIZATION

A portion of the disclosure of this patent document contains material which is subject to copyright protection. The owner, International Business Machines Corporation, has no objection to the facsimile reproduction by any one of the patent disclosure, as it appears in the Patent and Trademark Office patent files or records of any country, but otherwise reserves all rights whatsoever.

FIELD OF THE INVENTION

This invention is related to computers and computer systems and particularly to a method and system for use of the World Wide Web and other sources of information and for utilization of existing equipment advantageously for web server data access over networks and the Internet

RELATED APPLICATIONS

This application entitled "A Method for Distributed Task Fulfillment of Web Browser Requests", is related to other United States of America Patent applications filed concurrently herewith, and specifically to the applications entitled "Computer Network for WWW Server Data Access over Internet", U.S. Ser. No. 08/474,571, filed Jun. 7, 1995, now U.S. Pat. No. 5,721,908; and "A Service Agent for Fulfilling requests of a Web Browser", U.S. Ser. No. 08/474,576, filed Jun. 7, 1995 pending; and "A Sub-Agent Service Agent for Fulfilling Requests of a Web Browser", U.S. Ser. No. 08/474,575, filed Jun. 7, 1995 now U.S. Pat. No. 5,745,754; and "A Web Browser System", U.S. Ser. No. 08/479,481, filed Jun. 7, 1995 pending; and "A Method for Fulfilling Requests of a Web Browser" U.S. Ser. No. 08/474,577, filed Jun. 7, 1995 now U.S. Pat. No. 5,701,451.

These applications have a common assignee, International Business Machines Corporation, Armonk, N.Y.

GLOSSARY OF TERMS

While dictionary meanings are also implied by certain terms used here, the following glossary of some terms may be useful.

World Wide Web (WWW)

The Internet's application that lets people seeking information on the Internet switch from server to server and database to database by clinking on highlighted words or phrases of interest. An Internet WWW server supports clients and provides information.

Home page

A multi-media table of contents that guides a web user to stored information about an organization on the Internet.

Gopher

A menu-based search scheme, which as developed at the University of Minnesota, lets a user reach a destination on the Internet by selecting items from a series of text menus.

Access Agent

A logical component that provides support for different access protocols and data streams—Frame Relay, HDLC (High Data Link Control) CBO (Continuous bit Operations, ATM (Asynchronous Transfer Mode), or TCP/IP.

Application Processing Agent

A data processing agent running in a server data processing system which performs tasks based on received requests from a client in a distributed environment. In our preferred embodiment, our application processing agent for database retrieval is our DIS server, a data interpretation system server and database gateway which is coupled to our web server HTTPD via a network. In our preferred embodiment an application processing agent employs executable object programs as command file objects, which in the preferred embodiment are capsule objects.

Client

A client is a computer serviced by the server which provides commands to the server.

Data Interpretation System (DIS)

IBM's object oriented decision support tool.

Capsule

A DIS capsule is a program created by a DIS programmer and executed in the DIS environment. A DIS capsule is a preferred example of a capsule object. A capsule object is a specialized form of a command file (which is a list of commands to be executed, as in an EXEC or *.BAT batch file. The capsule object is created with an object environment, as is supplied by IBM's DIS. Other object environments are IBM's SOM and DSOM, and Microsoft's COM environment.

Internet

The connection system that links computers worldwide in a web.

Server

A machine which supports one or more clients and is part of the web. Any computer that performs a task at the command of another computer is a server Slip or PPP connection.

Serial-line Internet protocol and point-to-point protocol, respectively, for providing a full access connection for a computer to the Internet.

TCP/IP

Transmission control protocol/Internet protocol. A packet switching scheme the Internet uses to chop, route, and reconstruct the data it handles, from e-mail to video.

InterNetwork Routing (INR)

The link between systems which routes data from one physical unit to another according to the applicable protocol. The protocol will employ a URL address for Internet locations.

URL

Universal resource locater, a Web document version of an e-mail address. URLs are very cumbersome if they belong to documents buried deep within others. They can be accessed with a Hyperlink.

Web browser

An program running on a computer that acts as an Internet tour guide, complete with pictorial desktops, directories and search tools used when a user "surfs" the Internet. In this application the Web browser is a client service which communicates with the World Wide Web.

HTTPD

An IBM OS/2 Web Server or other server having Hypertext Markup Language and Common Gateway Interface. In our preferred embodiment, the HTTPD incorporates our control program agent and is supported by an access agent which provides the hardware connections to machines on the intranet and access to the Internet, such as TCP/IP couplings.

HTTP Hypertext transfer protocol

Hypertext transfer protocol. At the beginning of a URL "http:" indicates the file contains hyperlinks.

Hyperlink

A network address embedded in a word, phrase, icon or picture that is activated when you select the highlighted tidbit. Information about that item is currently retrieved to the client supporting a Web browser.

HyperText Markup Language (HTML)

HTML is the language used by Web servers to create and connect documents that are viewed by Web clients. HTML uses Hypertext documents. Other uses of Hypertext documents are described in U.S. Pat. No. 5,204,947, granted Apr. 20, 1993 to Bernstein et al.; U.S. Pat. No. 5,297,249, granted Mar. 22, 1994 to Bernstein et al.; U.S. Pat. No. 5,355,472, granted Oct. 11, 1994 to Lewis; all of which are assigned to International Business Machines Corporation, and which are referenced herein.

BACKGROUND OF THE INVENTION

The Internet is not a single network, it has no owner or controller, but is an unruly network of networks, a confederation of many different nets, public and private, big and small, that have agreed to connect to one another. An intranet is a network which is restricted and while it may follow the Internet protocol, none or only part of the network available from outside a "firewall" surrounding the intranet is part of the agreed connection to the Internet. The composite network represented by these networks relies on no single transmission medium, bi-directional communication can occur via satellite links, fiber-optic trunk lines, phone lines, cable TV wires and local radio links. When your client computer logs onto the Internet at a university, a corporate office or from home, everything looks local, but the access to the network does cost time and line charges.

Until recently, "cruising or surfing" the Internet was a disorienting, even infuriating experience, something like trying to navigate without charts. The World Wide Web, a sub-network of the Internet, introduced about two years ago, made it easier by letting people jump from one server to another simply by selecting a highlighted word, picture or icon (a program object representation) about which they want more information—a maneuver known as a "hyperlink". In order to explore the WWW today, the user loads a special navigation program, called a "Web browser" onto his computer. While there are several versions of Web browsers, IBM's example is the new WebExplorer which offers users of IBM's OS/2 Warp system software a consistent, easy to use desktop of pictorial icons and pull down menus. As part of a group of integrated applications available from IBM for OS/2 Warp called the IBM Internet Connection, lets users log onto the Internet.

To this point the World Wide Web (Web) provided by Internet has been used in industry predominately as a means of communication, advertisement, and placement of orders. As background for our invention there now exists a number of Internet browsers. Common examples are NetScape, Mosaic and IBM's Web Explorer. Browsers allow a user of a client to access servers located throughout the world for information which is stored therein and provided to the client by the server by sending files or data packs to the requesting client from the server's resources. An example of such a request might be something called GSQL (get SQL) which was a NCSA language and CGI server program developed to getting textual results for a client caller. Developed by Jason Ng at the University of Illinois, this document provided a way to map SQL forms against a database, and return the textual results to the client caller. This system is unlike the present invention, and presents difficulties which are overcome by our described system.

These servers act as a kind of Application Processing Agent, or (as they may be referred to) an "intelligent agent", by receiving a function request from a client in response to which the server which performs tasks, the function, based on received requests from a client in a distributed environment. This function shipping concept in a distributed environment was first illustrated by CICS as a result of the invention described in U.S. Pat. No. 4,274,139 to Hodgkinson et al. This kind of function, illustrated by CICS and its improvements, has been widely used in what is now known as transaction processing. However, servers today, while performing many functions, do not permit the functions which we have developed to be performed as we will describe.

Now, "surfing" the Internet with the WWW is still a time consuming affair, and the information received is not generally useful in the form presented. Even with 14,400 baud connection to the Internet much line time is tied up in just keeping going an access to the Internet, and the users don't generally know where to go. Furthermore the coupling of resources available on a company's intranet and those available on the Internet has not been resolved. There is a need to reduce gateways, make better use of existing equipment, and allow greater and more effective usage of information which is resident in many different databases on many different servers, not only within a homogeneous network but also via the Internet and heterogeneous network systems.

The problems with creating access to the world via the Internet and still to allow internal access to databases has been enormous. However, the need for a system which can be used across machines and operating systems and differing gateways is strongly felt by users of the Internet today. Anyone who has spent hours at a WWW browser doing simple task knows how difficult it still is to navigate thorough arcane rules without knowing where to go and even if you know what you are doing spending hours doing routine tasks. Many needs exist. As one important instance, until now we know of no way to access data on multiple databases of different types using a single user request from a client. This and other difficulties are solved by our invention.

SUMMARY OF THE INVENTION

In accordance with our invention needless user intervention is eliminate or greatly reduced with a Web server supports an HTTPD which is provided with the capabilities of our control program agent which organizes sub-agents supporting command file objects or capsules to perform tasks in support of a Web browser's request for service as programmable functions receiving parameters as input and providing as their output handled by the control program agent task completed results for reporting in accordance with the Web browser request in the form and to the location determined by a request and handling these request without needless user intervention.

In accordance with our invention, we have created a way to allow Web users to request information that is created by a data interpretation system (DIS) and then presented by a web server to the user of the web. Our solution provides a way of requesting and processing and presenting information on the Web. In the process, data is retrieved from multiple sources which may be located remotely and accessed via an intranet routing and via the Web Internet and processed by our decision support capsules. Now companies and universities, and other users that want to access data located on different databases, want that data processed and formatted, and presented in a form the user desires, such as a graphical format. Our solution permits users to access information from various sources and obtain information at a desired location as a result of a single request which is responded to by an organization of facilities and command file sub-agent decision support capsule objects by our command program agent. Users of the information can be internal to a company, or external. The result can be furnished to a user at a location which is internal or external to the company, and as specified at a specified location with a form and format desired. This allows a report to be managed by the web support services we provide, and in a form consistent with the request, but without requiring a consistent interface solution.

In order to create a way for Web users to request information generation we provide a web server with a control program agent which is linked to a decision support tool of a data interpretation system server, the application processing agent, and then have that server retrieve, process, and format information which is presented to the user on the Web by the Web server. In our preferred embodiment, we have provided a link between a Hypertext Markup Language (HTML) document using a common gateway interface, and open data interpretation system server (ODAS). As a result, Web clients can request DIS reports to be generated, specify the parameters to be used in generating the reports, and then view the report results on a Web home page. The DIS capsule can generate graphical information, such as colored pie charts, line graphs, bar graphs, and other forms of generated information. Since the Web server is capably of presenting the results in desired formats, the full capabilities of a DIS report are utilized.

Our invention provides a method and system for allowing a user of a client to access and assemble information structured and reported to the user in accordance with his desires, selecting information for disparate servers which are located within a network can be an intranet or internal network, such as a LAN or WAN not normally accessible to the Internet, or coupled to the Internet. In accordance with our invention one can access data on multiple databases of different types using a single user request from a client. We also allow the facility for providing specialized specific requests to be created for routine use, as well as the facility to formulate generalized or specialized ad hoc requests. In addition, we provide besides query and update capability, the ability to perform calculations with respect to any retrieved data, to format the information in text or in graphics, and the facility of presenting the results to the client for display or other use.

The improvements which we have made achieve a means for accepting Web client requests for information, obtaining data from one or more databases which may be located on multiple platforms at different physical locations on an Internet or on the Internet, processing that data into meaningful information, and presenting that information to the Web client in a text or graphics display as a location specified by the request.

Our invention of providing a web server with a control program agent allows organization of decision support functions to be executed by application processing agent servers located throughout the Internet to gather and supply information not presently available with any existing resources without the need of endless intervention on the part of a requesting user of the WWW; further enabling an ordinary user to take advantage of expertise which is provided by programmable sub-agents developed by those with particular expertise in a given area as well as enabling use of standard routines commonly needed.

These improvements are accomplished by providing for Web clients to request information from an application processing agent in which the application processing agent server performs tasks based on received requests from a client in a distributed environment by a web server supported by an access agent link and control program agent which in turn causes a decision support function to be executed by the application processing agent server. This Is performed within the distributed environment by the application processing agent server which forms part of a network coupled to and under control of the control program agent. According to our invention the decision support function is provided by a data interpretation system which functions as part of the application processing agent and the decision support function is programmable and generated by a data interpretation system, DIS or other decision support element performing similar functions, and provided in a form accessible to our control program agent which presents the output generated to be presented to the user on the Web who made the initial request. We have provided, in a preferred embodiment, a link between IBM's Hypertext Markup Language (HTML), the Common Gateway Interface (CGI), and the Open DIS Access Server (ODAS), all of which may be used on machines which are are commercially available from IBM. In order to write additional functions which develop our invention, the reader is referred to the Medaphor Data Interpretation System publication "Developing Applications with OpenDIS Access Service, Version 2.0, available from IBM, First Edition (September 1994) Part Number 315-0002-01 which is incorporated herein by reference.

Our improvements relating to our control program agent is in accordance with our preferred embodiment is normally installed on an IBM HTTPD which is an IBM OS/2 Web Server or other server having Hypertext Markup Language and Common Gateway Interface. In our preferred embodiment, the HTTPD incorporates our control program agent and is supported by an access agent which provides the hardware connections to machines on the intranet and access to the Internet, such as TCP/IP couplings. The hardware for the Web server is thus a workstation, such as IBM's PS/2 model 80 with OS/2. However, the HTTPD can be installed in PCs and upwardly also in machines which range across IBM's line of computers from powerful personal computers to mainframe systems which support MVS, IBM's operating system which enables multiple kinds of operating systems, including "UNIX" to co-exist on a single platform. As a result of our invention Web clients can request DIS reports to be generated by the application processing agent specifying the parameters to be used in generating the reports, and then as a result of the request receive a result which is presented, as a visual display or otherwise, on a Web page for use by the requesting user. Our machine implementation allows a user having DIS access to generate graphical information such as colored pie charts, line graphs, bar graphs, etc. Since Web browsers such as IBM's Web Explorer are capable of displaying these formats, all the functions which can be created by a DIS capsule can be utilized by a user of our invention.

According to our improved method, an Internet World Wide Web user connects to a Web server through the use of a Web browser. In accordance with our preferred embodiment, we use HTML as the language used by Web servers to create and connect documents that are viewed by Web clients. HTML is an example of a hypertext language having the facility of clicking on a highlighted word, string of words, or image in order to move to another HTML document or invoke a program on the server. An example of a Web client would be a machine used by a person using IBM's Web Explorer product. In using our invention a user may click on the hypertext in a document to reference a function which will be provided by an application processing agent server. The user is able to connect to another document that may be on another Web server. HTML commands are used to reference other documents. HTML is used to reference programs available on a server. and, pass parameters to those programs. The application processing agent server executes a program when it is referred to by a Web client via a control program agent resident. preferably. in a Web server.

The Web client selects the information that they wish to view by using the HTML created page. the Web server takes the client request and passes it to a C program implementation of our control program agent. Web servers, such as HTTPD for OS/2. with our control program agent are able to provide access to executable programs through the use of the Common Gateway Interface (CGI). When a program is referenced by the HTML, any parameters are passed to the program and it is executed. In our preferred embodiment we have used CGI to invoke programs that we have developed that will interface with the DIS product. CGI is an example of a software gateway from a Web server to programs outside the Web server application.

The control program agent that is called in this instance by the Web server through the CGI interface. passes the Web client request along to a data interpretation system DIS via a Open Dis Access Server (ODAS). ODAS is a feature of a data interpretation system DIS that allows programs to initiate DIS functions. such as invoking DIS capsules. Our control program agents interface with DIS through ODAS to submit DIS capsules for execution. DIS capsules are basically programs that DIS application programmers create with the DIS programming language. In accordance with our invention, we have written capsules which are executed as a DIS capsule on a server to gather data from one or more databases, process that data, and create a report in one of many formats, which we will describe by way of example. After the DIS capsule completes executing, in accordance with our preferred embodiment, the results that are generated during execution of a capsule are stored in a file on the application processing server.

After DIS creates a file that contains the formatted report results. our control program agents program dynamically creates HTML tags to present the formatted report back to the Web client on the Internet. Our control program agents using the CGI interface can create HTML commands dynamically. In this way a program can present information on a Web browser for the Web client.

After the DIS capsule has created the file containing the report request results, the control program creates HTML statements dynamically that display the report results to the Web browser.

Alternative means of presenting the data are shown by alternative routing. The user requesting the report may wish to have the report results sent to another location in addition to or instead of displaying the report results to the Web browser. This information is provided during the request phase. As a result of the alternative report request, and according to the parameters indicated therein. the report results can be sent by the control program via electronic mail. i.e. TCP/IP Sendmail facility and Lotus Notes, to one or more locations on the Internet. The report results can be sent as a file and as a note. The request can request a voice response. which can be routed to a voice response unit. Thus, with a call to a translator. the text can be converted to voice. and even translated along the way. The report results can also be sent to a fax machine. or to a computer that has the capability of receiving fax data.

We use these report concepts to present report files created by DIS capsules on the Web client display.

These and other improvements are set forth in the following detailed description. For a better understanding of the invention with advantages and features. refer to the description and to the drawings.

BRIEF DESCRIPTION OF THE DRAWINGS

FIG. 1 shows schematically an overview of the preferred embodiment and particularly shows a typical distributed computer system which has internal and external networks including the Internet to connect clients to World Wide Web servers and other servers within the system in which our invention is situate.

FIG. 2 shows a inquiry screen (home page) which is displayed on a client after the client is coupled to its server (which may be an Internet server) by a Web browser.

FIG. 3 is a next screen which illustrates how a request is made according to a users desires. making a request in accordance with our invention with an input screen shown.

FIG. 4 is a sample result screen which is returned to the client after the requested service is provided by the computer system network in accordance with our invention formatted according to the specifications of a DIS capsule.

Figures 5, 6:
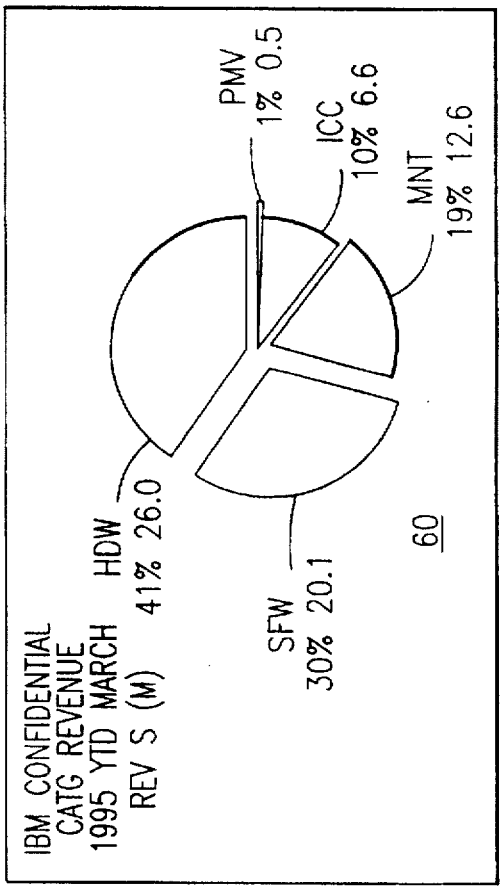
FIG. 5 is a next screen which illustrates how a request is made according to a users desires, making a request in accordance with our invention by selection from a menu and through the use of image mapping.
FIG. 6 is an example of a graphical result screen which is returned to the client after the requested service is provided by the computer system network in accordance with our invention.

(Note: For convenience of illustration, in the formal drawings FIGURES may be separated in parts and as a convention we place the top of the FIGURE as the first sheet, with subsequent sheets proceeding down and across when viewing the FIGURE, in the event that multiple sheets are used.)

Our detailed description explains the preferred embodiments of our invention, together with advantages and features, by way of example with reference to the following drawings.

DETAILED DESCRIPTION OF THE INVENTION

FIG. 1 illustrates a information delivery solution of a typical combination of resources including clients and servers which may be personal computers or workstations as clients, and workstations to mainframe servers as servers. The various elements are coupled to one another by various networks, including LANs, WANs, and other networks, which may be internal SNA networks or other like internal networks, and also providing access to the Internet, which couples the system to the world via Internet.

The Preferred Embodiment

Turning now to our invention in greater detail, it will be seen from FIG. 1 that our preferred embodiment provides a Web browser 10, which is coupled to a Web server 11. Our Internet WWW browser is an intelligent computer system, such as an IBM PS/2, or other computer, an IBM ThinkPad, an RS/6000 works as well and connections are made to the network via OS/2 WARP Connect, an IBM product. The Internet Web browser in the intelligent computer system which performs the Web browser function has IBM Web Explorer, or NetScape or Mosaic installed thereon. This computer system 10 is bi-directionally coupled with the OS/2 WARP Connect facility over a line or via a wireless system to our preferred computer system which we call our Web server. This system is a PS/2 or RS/6000 or other similar system which includes our control program agent 73, which will be discussed below. Web server 11, in our preferred embodiment is coupled again bi-directionally via a line or wireless coupling to a computer system, such as a PS/2 or RS/6000 or other server which supports and performs the server function of ODAS server 12, which is coupled to the distributed DIS network, here shown as LAN 13. ODAS 12 may be located on the same server as the Web server 11 or be located at a separate service machine, such as an IBM Digital Server. The Web server is logically coupled to our application processing agent server via a network. We call our application processing agent server a DIS File server 14 because is comprises a data interpretation system which supports the decision support functions we provide which is today most inexpensively provided by an IBM computer system which supports OS/2. In our preferred embodiment, the intranet network is a LAN. Thus the components of the DIS LAN 13 comprise a DIS File Server 14, a general purpose workstation 15 which can be used for capsule development, a local database server 16, a Capsule Server 17 for storing a plurality of DIS capsules ready for user, a Database Gateway Server 18 which performs the gateway functions to access databases which are linked to it, these databases include geographically distributed databases which can be located, for instance, in Chicago, New York, Dallas, Los Angeles, and each of which can be a different supported database, such as DB2 database 19, ORACLE database 20, Sybase database 21, Redbrick database 22. In our preferred embodiment all servers are coupled with a conventional LAN or WAN connection, with a preferred IBM token ring shown. Reference should also be had to our alternative preferred embodiment discussed below with respect to FIG. 11.

Figure 11:
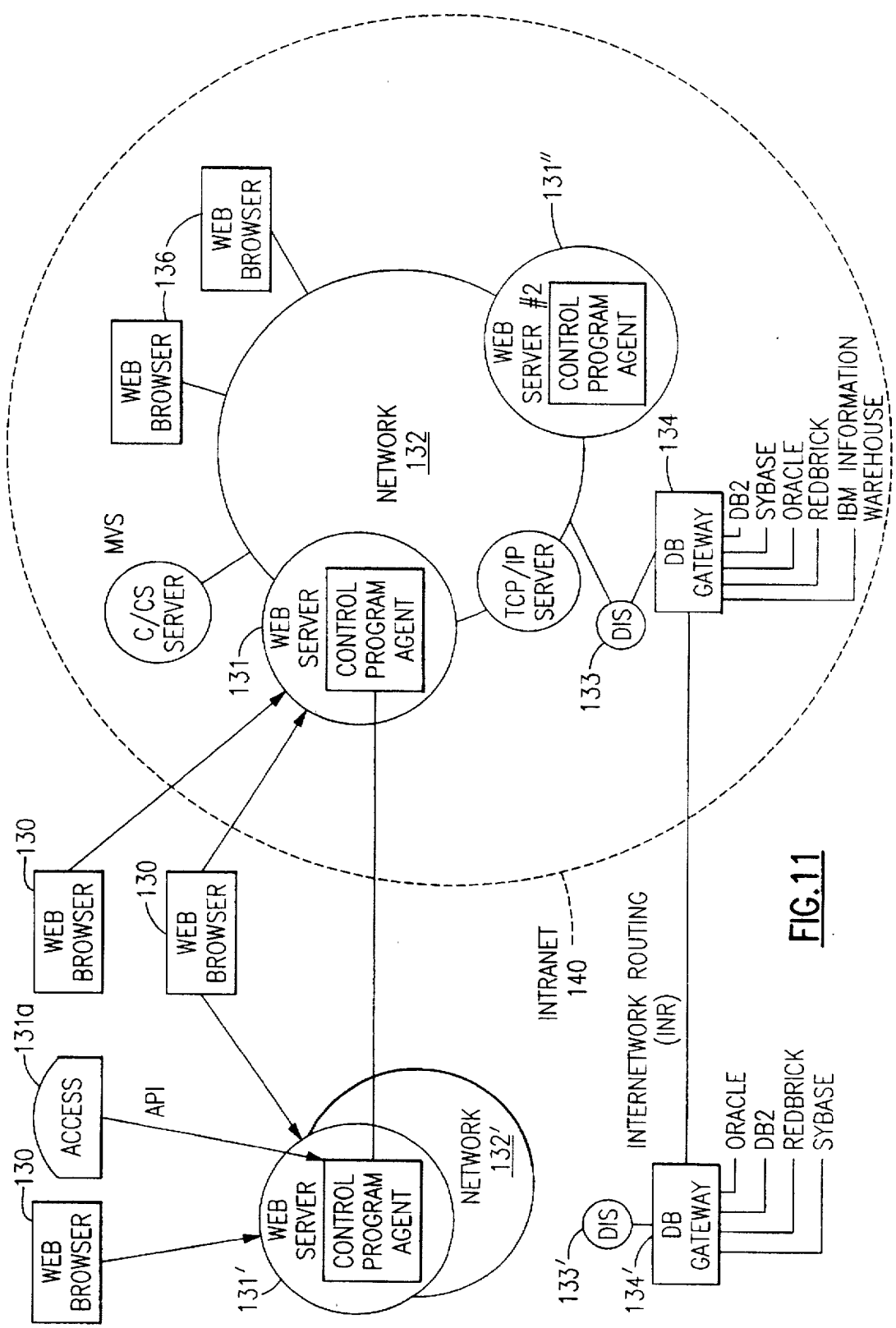
FIG. 11 illustrates an alternative configuration of the network system as it may be employed for permitting access to information available through homepages and in data warehouses where access to the homepage or database may or may not be restricted by a firewall.

Thus, in connection with the preferred embodiment of FIG. 1 as well as with respect to FIG. 11 it would be appreciated from the schematic overview illustrated by FIG. 1 and FIG. 11 that our invention may be employed in a distributed computer system environment which has internal or intranet networks represented in our preferred embodiment by the DIS Network 13 and external networks including the Internet to connect clients to World Wide Web servers and other servers within the system in which our invention is situate. Our invention makes use of the entire network. The Web browser 10 can make a request to the Web Server 11 for a report. The Web server 11 with the facilities we provide causes the application processing agent which includes our DIS server 14 and its supporting communication server, the database gateway server 18, to act as an agent to gather data from one or more of the multiple databases, including the local database 16, DB2 database 19, ORACLE database 20, Sybase database 21, Redbrick database 22. Further details with respect to the use of our invention for database retrieval of information from multiple databases are provided as to the actions of the application processing agent functions of the database server(s) 18 with reference to FIG. 7.

Thus, returning to our simplified and preferred embodiment, FIG. 2 shows a inquiry screen (home page) 29 in the form which is displayed on a client after the client is coupled to its server (which may be an Internet Web server 11) by a Web browser 10. The entire screen contains information and a plurality of objects. Once the home page is displayed, with appropriate descriptive guidance as illustrated by the FIG. 2, the user can interact, for example, by clicking on image objects 30, 31, 32, 33, 34. As a example should the user want to make a special request in accordance with our invention, he could click on image 30. This would take the user to the next screen, illustrated by FIG. 3. Alternatively the user could select by clicking on image 31 another menu screen, illustrated by FIG. 5. At this point also, a specialized format could be selected by double clicking first on a format select image illustrated by image objects representing access to menu screens 32, 33, 34, one or more of which is a gopher.

The use of selection of icon image object is a function provided by HTML and programmers knowing this language can readily create variants to the images and functions we have illustrated. Thus incorporated within the drawings are to be understood to be the variants that can thus be created using our examples, as well as extensions and combinations thereof.

When the user selected image 30 by clicking on the image 30, FIG. 3 appears. FIG. 3 is the next screen which illustrates how a request is made according to a users desires, making a request in accordance with our invention with an input screen shown. The content of FIG. 3 is preformatted 40 except for the user entries which are to be entered in the data input fields 41. In this example the input field 41 is a userid. After a user has entered in field 41 an acceptable input, he would then click on instruction key 42. The instruction key illustrated is submit a request. At this point the Web server captures the information entered by the user, as described in FIG. 7. It will be appreciated that the Web server captures the information entered by the user, including specialized input, as well as any "hidden" default information, which can include password authorizations, charge account identification, and other information that can be used by the system in responding to the request. Thus the system can assume that the "hidden" password is an authorization to perform some function, such as include information from confidential source, or exit to the Internet. The charge authorization can also be tracked and accumulated by the system as it parses through its functions to charge back chargeable usages. If a request is for an order of an item, the actual item requested can be shipped and billed with this information. Since these functions are "hidden" they do not appear in the FIGURE but included with a request. The return of the request is illustrated in FIG. 4.

Figure 9:
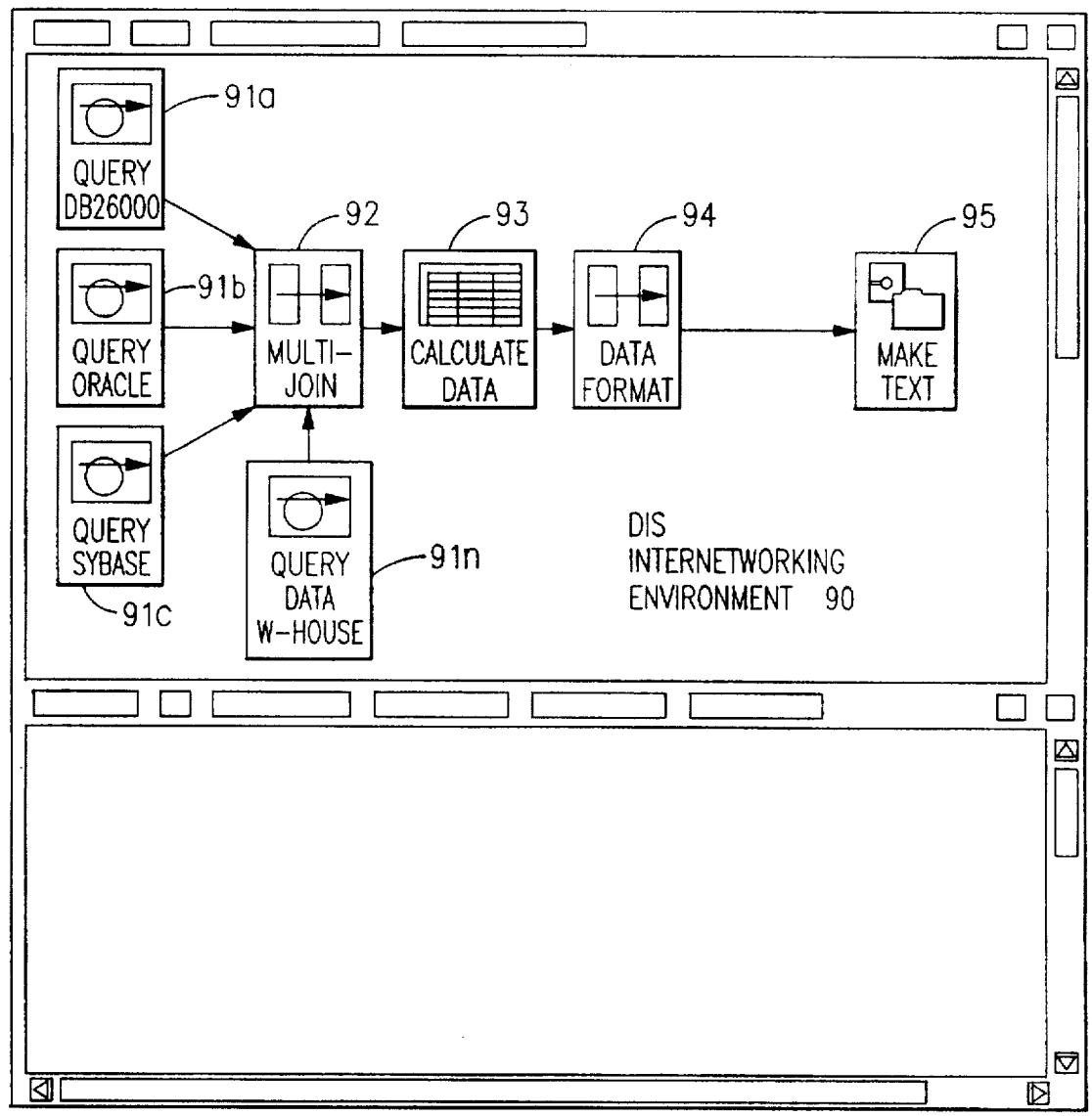
FIG. 9 illustrates by way of example a DIS capsule that creates a text report file.

FIG. 4 is a sample result screen which illustrates how a sample report conforming to the request results are presented to the client after the requested service is provided by the computer system network in accordance with our invention formatted according to the specifications of a DIS capsule which is illustrated by example in FIG. 9. In this example, the return was a file, whose file name is displayed as P81484 at 43. Informative text accompanying the file is included as illustrated by the example information 44. The screen provides the content of file 43 in the requested form of preformatted text 50 in the form of a display of a text report generated by a DIS capsule stored in the DIS server 17. While we show text as the form the report results, the form of the request can be another form of presentation, as and image, a voice response, or other multimedia presentation. Reports can be returned translated into any desired language based upon the request, as may be provided by DIS capsule calls to a translator. These features are included in the result 50 report.

When the user selected image made by clicking on the image 32 in FIG. 2, FIG. 5 appears. FIG. 5 is a next screen which illustrates how a request is made according to a users desires. A user makes a request, in this instance for sales results within the organization for YTD Catalog Revenue in accordance with our invention by entering text data into the data entry areas 41 and 42 of the formatted screen with information as to type of data selected 40A which will be translated into specific report information created by a DIS capsule.

Figure 10:
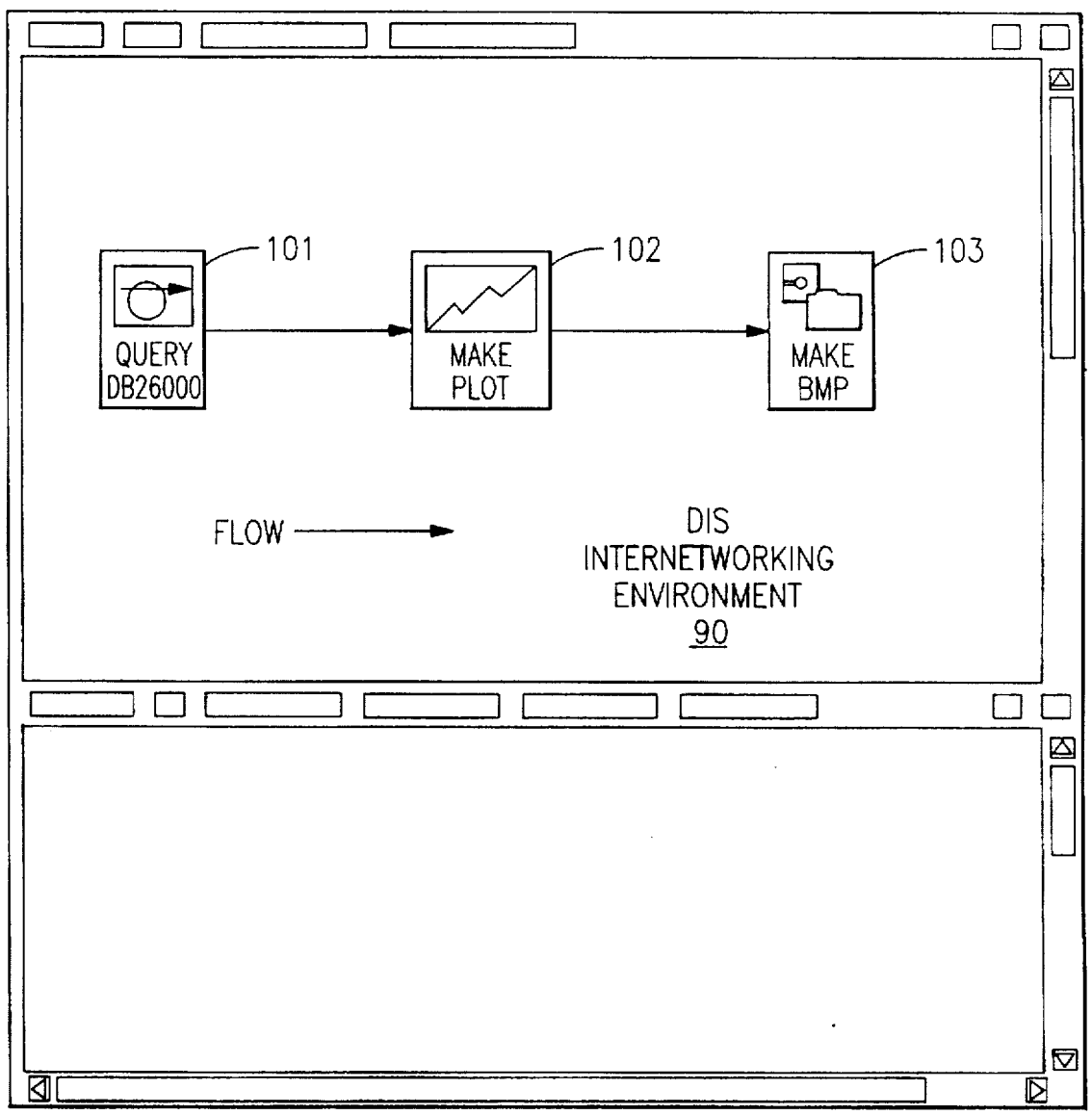
FIG. 10 illustrates by way of example a DIS capsule that creates a graphical report file.

FIG. 6 is a sample result screen which illustrates how the request results are presented to the client after the requested service is provided by the computer system network in accordance with our invention formatted according to the specifications of a DIS capsule. In this instance selection of the object 32 links to the the screen of FIG. 5, which in turn with the DIS capsule created the output shown in FIG. 6. DIS Capsules will be illustrated by examples in FIG. 9 and 10. In this example the output of the DIS capsule illustrated in FIG. 10 is presented on the screen shown by FIG. 6. The screen comprises a file name identifier, descriptive information 61, and preformatted text 60 which is the display of the named file P555119. This is the display of a graphic report showing what might be deemed (but is not) Confidential information relating to Catalog Revenue for 1995 YTD, with revenue given in $M, and breakout as to HDW, SFW, PMV, MN and MNT from selected locations in Chicago, New York, Dallas, and Los Angeles, all of which are located on different systems, and which, as illustrated in FIG. 1, may be on different databases such as DB2, Oracle, and Sybase relational databases. This report was generated by a DIS capsule which is illustrated in FIG. 9. This example illustrates how multiple actions can be taken on information retrieved. In this example data was translated into image material by calculation and formatting in the form of a graphic pie shaped report. Other image data could also be displayed, as frames of selected images, or a sequence of images in the form of a moving picture display, which can be outputted from a server as will be described in FIG. 11.

Figure 7:
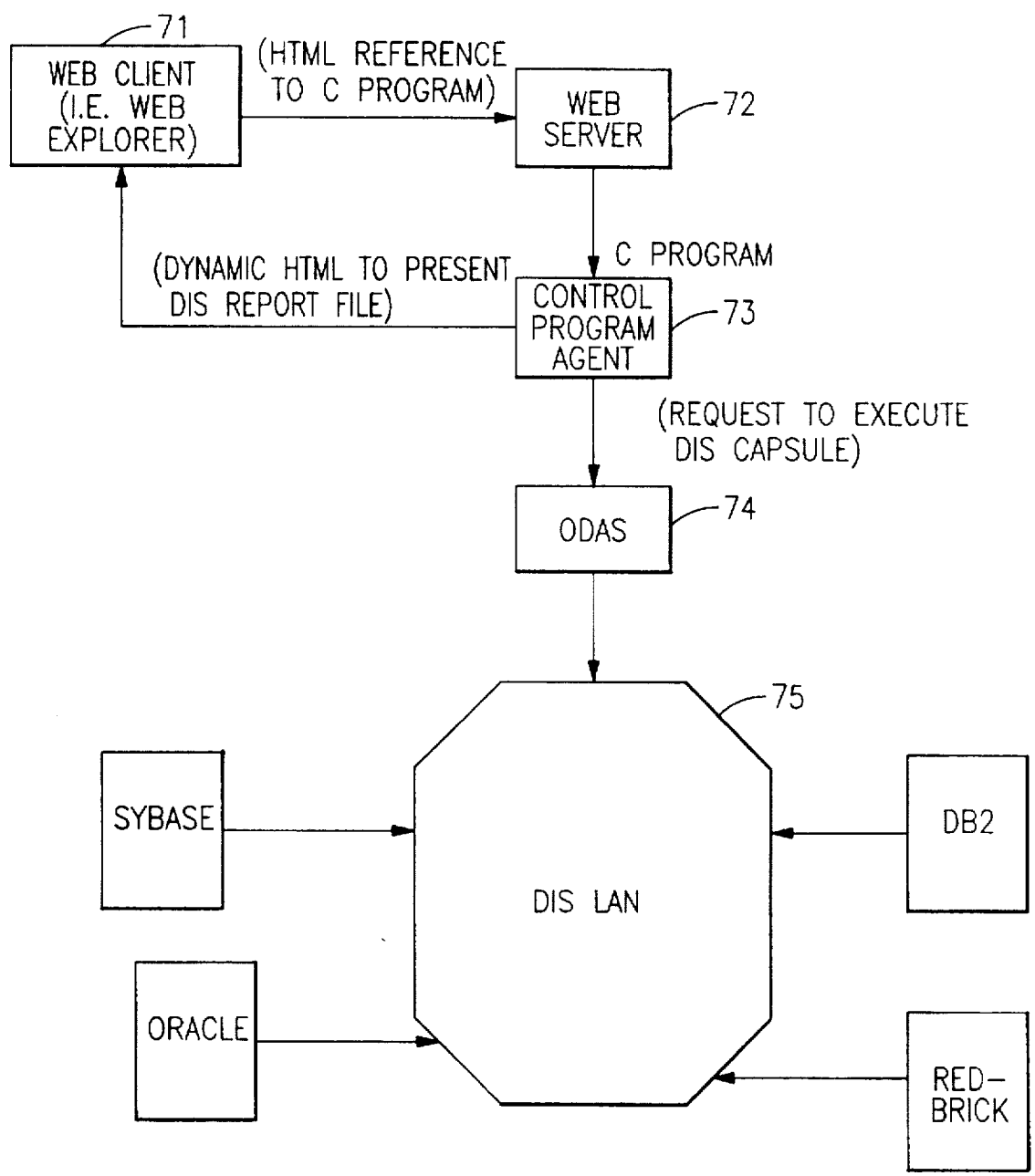
FIG. 7 illustrates a flowchart showing data flow between a web server and decision support system tool such as IBM's Data Interpretation System (DIS), and shows the coupling of a Web client to a Web server and the coupling of a request to execute a DIS capsule and the coupling within the Web server from ODAS to a distributed DIS LAN with heterogeneous connections to multiple databases.

FIG. 7 illustrates a flowchart showing data flow between a web server and decision support system tool such as IBM's Data Interpretation System (DIS). FIG. 7 shows the coupling of a Web client 71 (corresponding to Web browser 10 in FIG. 1) to a Web server 72 (corresponding to Internet WWW server 11) and the coupling of a request to execute a DIS capsule.

The Web browser 71 can make a request to the Web Server 72 for a report through the use of HTML. The HTML document refers to our control program agent 73, which may be implemented with the C language or other language which can provide run code for the particular Web server which is employed. We illustrate our preferred program according to the description provided in FIG. 8. The Web Server 72 passes request data to and invokes our control program 73 through the use of the CGI in accordance with our invention. The control program uses ODAS 74 in ODAS server 12 to set DIS capsule parameters and initiates the execution of a DIS capsule located in this embodiment in DIS capsule server 17 according to our preferred examples illustrated in FIGS. 9 and 10.

After a DIS capsule completes execution, the file created by the DIS capsule contains the formatted report results requested by the user. Our control program 73 dynamically creates the HTML statements that present the file to the Web browser 10 screen. FIG. 7 shows the coupling within the Web server from ODAS 74 to a distributed DIS LAN 75 with heterogeneous connections to multiple databases DB2, Redbrick, Sybase and Oracle. Other sources of data can be linked to the LAN.

Preferred Embodiment Interface Between Server and DIS

Figure 8:
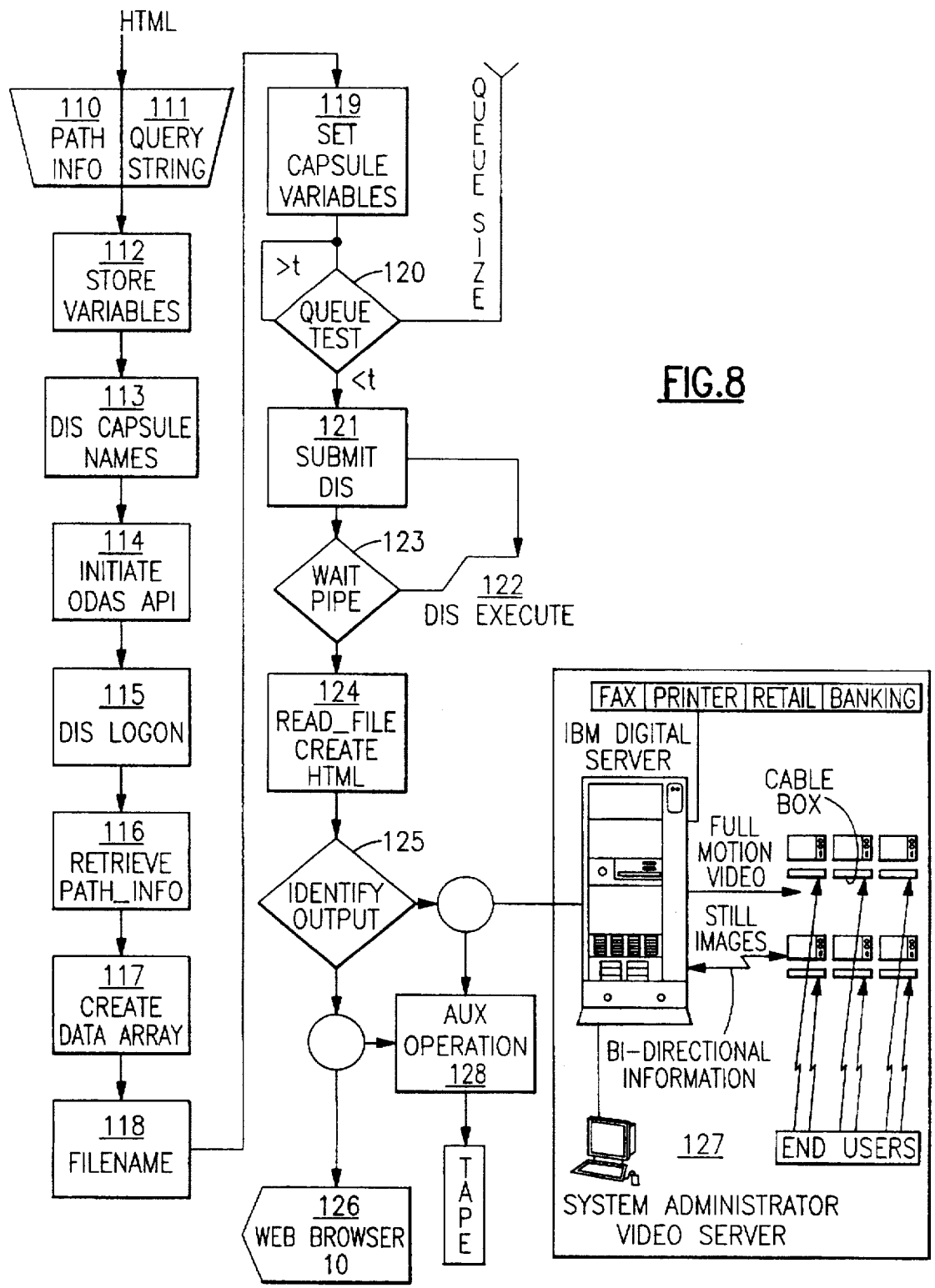
FIG. 8 illustrates as a flow chart the functions of the control program for the web server.

Our preferred control program agent 73 in FIGS. 1 and 11 is illustrated in detail by way of the flowchart of FIG. 8. In our preferred embodiment, this program can be written in C or other suitable language but for general appreciation of the details, we will describe the steps in detail. These steps can be implemented by programmers of ordinary skill in the art without undue experimentation after understanding the steps described below. The control program agent 73 is located in a Web server and provides an interface and execution functions. Thus in FIG. 11 the function is provided between the Web Server 131 (corresponding to Internet WWW server 11 in FIG. 1) and DIS which is located in a DIS server 133 (corresponding to server 14 in FIG. 1) and for presentation of results according to the instructions of the Web browser 130 (corresponding to browser 10 in FIG. 1) according to the request command, which in default is a return to the Web browser home page. This interface utilizes in our preferred embodiment the Web Server CGI and the DIS ODAS.

Before we proceed to the control program 73, it will be noted that in FIG. 11 the Web Browser 130 will link to a Web Server 131 accessing it on the Internet though a unique ID called the uniform resource locater to access the node which we call the Web server 131. When that access takes place an HTML document is displayed by the Web server 131 to the Web browser 130, as shown in FIG. 2. Now, the user makes his entries as described with respect to FIG. 2. Next the HTML document refers to the control program agent 73 and the Web server 131 through the use of the CGI invokes our control program agent 73. The Web server 131 retrieves data entered by the user from the HTML document and passes that data to our control program agent 73 upon invocation.

The Web Server 131 has a gateway interface that allows the server to invoke a control program agent 73 running on it and to pass input parameters to the control program agent 73 (FIG. 8) that were returned from the Hypertext document of the Web Browser. It will be appreciated that while we illustrate for our preferred example a single Web Server 131, the Hypertext document locates the particular Web Server that can support the request made by checking the details of the "hidden" defaults and those functions requested. Thus a menu request for a generalized search throughout the Internet may locate the particular service machine having an application processing agent which has the information desired. Once the control program 73 (FIG. 8) is invoked, the steps programmed for the machine to follow begins with a step 110 illustrated in FIG. 8. In reviewing this preferred control program agent it should be appreciate that steps 110 and step 111 are steps that are interchangeable in order and which obtain environment variable data from the HTML document return.

Thus step 110 obtains a PATH_INFO environment variable data. PATH_INFO contains data from the HTML document that referred the Web Server to our program. Specifically the data contains the name of the DIS capsule to call, the name of the file containing the HTML statements to use when building the HTML document that displays the DIS capsule results to the Web browser, and the type of file that the DIS capsule will create. All off this information is the variable data which is stored in a buffer environment in step 112, and which is used in subsequent steps.

Thus also, the control program proceeds with step 111 which may follow or precede or proceed in parallel with step 110 to obtain the QUERY_STRING environment variable data. QUERY_STRING contains data from the HTML document that referred the Web Server to our program. Specifically the data contains values selected by the user and/or default values selected by the HTML document designer. These values are set in the DIS capsule by our control program prior to execution of the DIS capsule. This information is used to set variables in the DIS capsule. All off this information is the variable data which is stored in a buffer environment in step 112, and which is used in subsequent steps.

Within the scope of the discussion of the control program agent illustrated by FIG. 8 it should be appreciate that the steps 112 through 125 include the utilization of an API set that provides a method of invoking executable programs located in a service machine which we denote as a sub-agent which executes in step 122 object capsules from our sub-agent DIS file server 14. This provides functions such as queue and update functions for databases on multiple platforms and allows the processing of data retried from a database to be performed, including executing calculations, doing formatting, charging of accounts and the storing of results as a file accessible to the control program agent. During processing our control program agent 73 provides setups for API calls which occurs in steps WHAT ARE THESE STEPS. Thus the control program agent will proceed as with an API set with step 113.

With the variable information now stored in a buffer, in step 113 the control program retrieves from a store, all of the DIS capsules that are used and the variable names associated with each DIS capsule and loads into memory associated with the control program the DIS capsule names available and the variable names associated with each DIS capsule.

At that point in step 114 the control program is ready to and does initialize a connection between our control program and the ODAS through the use of an ODAS API. In other environments another API performing similar functions could be used.

At that point, if required for control by the decision support system, and as required by DIS, the control program would log onto the port or desktop for the assigned user. Thus, our control program agent 73 in step 115 logs onto a DIS "desktop", our DIS file server 14.

Once the DIS capsule information is loaded into control program memory, the control program can and does in step 116 retrieve from its memory the DIS capsule variable names associated with the DIS capsule name passed to our control program in the step 110 where PATH_INFO is provided.

Next, in step 117 the control program creates a data array stored in the control program memory containing the DIS capsule variable names and the values for them that were passed to our control program in the QUERY_STRING step. These two steps 116 and 117 should be done in order, even though steps 110 and 111 can have an arbitrary order. At this point in step 117 you are matching the DIS capsule variable names with the data that was passed to the control program in the QUERY_STING environment variables.

Next, in preparation for a report, in step 118 the program creates a unique filename which may include data originated by the HTML document's variables stored in step 112 (dotted line) to pass to the DIS capsule as a DIS variable for use in naming the report which will be created by the DIS capsule. As a result, the DIS capsule will create that file with the unique file name during its process.

In anticipation of DIS capsule execution, the values of variables used by the DIS capsule are obtained from the data array in the control program memory containing the DIS capsule variable names and the values for them that were passed to our control program in the QUERY_STRING step. This is done in step 119 using the ODAS API to set the DIS capsule variable values.

At this point the capsule server 17 for the DIS server 133 attached to the Web Server 131 via network 132 will have a DIS capsule services queue. This queue is the queue of jobs being requested of the Dis Capsule Server 17. For the current job request (other like requests being perhaps still in the queue) we use the ODAS API to query the contents of the DIS Capsule Services queue. If the queue size is larger (>t) than a threshold level, then the process enters a wait state until the queue size is reduced to a tolerable level. The queue test of step 120 is a loop test which returns to test the queue size until a test answering "is the queue of a size that execution can proceed?" (<t) is answered "YES".

Whenever the queue test is answered YES, at that point the ODAS API is used to submit a DIS capsule for execution in step 121.

After the ODAS API submits a DIS capsule for execution the particular request process being executed by the control program enters a wait state until completion of the DIS capsule execution. For this step of the process the control program uses the ODAS API to wait for completion of the DIS capsule execution performed by the DIS capsule execution 122. During a wait state other requests can be processed by the control program, as requests are fed through the control program as a pipeline, in this WAIT PIPE API step 123, so that the control program continually advances requests through the system.

During the wait state 123 the ODAS API looks for a completion signal. When that is received, the control program then in step 124 reads the file identified by the name passed to the control program in the first PATH_INFO step that contains the HTML statements which are to be presented with the DIS report results.

While in step 124 the control program reads the file identified, it dynamically creates new HTML statements to display the preformatted text to the Web browser. The new HTML statement include the information retrieved from the file in step 113 so that it can be displayed as a header 44 accompanying the report to be displayed, along with the filename 43.

At this point, in step 125 the control program tests for the kind of report to be created by obtaining information from stored variables and identifies output parameters, such as whether the report is to be a text report, or a graphical report. At this point the control program branches to the sequence applicable to the kind of report to be created. If the output is to be routed the the Web server 10, then the output is routed to the Web server in step 126.

If a text file report is created by the DIS capsule, that determines that a text display is to be reported and the the control program reads the file created by the DIS capsule and dynamically creates HTML statements to display the data lines to the Web browser.

If a graphics file is created by the DIS capsule, that determines that a graphics display is to be reported and the the control program dynamically creates the HTML statement to display the graphics file to the Web browser.

On the other hand, the control program agent allows alternative output direction, and if the output is another type, or an additional output, as for broadcast, it can be routed to another destination. In step 127, we illustrate how using the IBM Digital Server, output can be routed to a requestor selected resulting output selected from a group of possible output units, comprising fax, printer, retail or banking installations, or provided as a series of full motion videos or still frames which are can be transmitted to display devices, such as a TV set under control of end users with a set-top box cable control. These facilities are provided by providing the output of our control program agent from the web server to the alternative output device 127. In this case, the IBM Digital Server, which with an RS/6000 CPU, Network I/F Bus, DISKs, modems, and X.25 Data Switch provides the hardware to route the output to a variety of output devices, to fax, printer, retail, banking, TV or cable customers via the digital server service machine for full motion and still video, supplied with MPEG 2 and MPEG 1 protocol images respectively, to subscribers.

Along the way, the output can be coupled to an auxiliary function, such as back-up or accounting processes 128 which allow for charging for system utilization and service charges for services and items requested. These processes will make use of hidden variables associated with the request, such as charge authorization. One of the hidden variables which may be associated with a request is a credit card number. The credit card number, is preferably encrypted, with a DES or RSA encryption utility, and this along with access authorization variables, will allow access to sensitive databases which reside behind firewalls. If selected data according to the request is permitted to the access authorized user at the location inside or outside the Internet, the data can be included in the results reported by our system to the Web browser.

Preferred Embodiment of Text DIS Capsule

In accordance with our invention, an HTML document, which is running on a web server, refers to the control program agent. The web server then invokes the control program agent. The control program agent has access to command files, which provide the preferred file command objects in the form of DIS capsule objects, or DIS capsules as they are known. The command file contains a list of available DIS capsules. Accordingly, there is not need for the HTML document to know how to get to the command file, as the control program supplies this access. A capsule object, as a DIS capsule, can call other routines which may be written in well known programming languages such as Visual Basic or C. These routines become part of the capsule object by the reference, and these routines perform such functions as account tracking, compression, calculation, handling specific custom outputs such as video, voice, translation, and enable programmability of the capsule objects. The capsule objects also have standard object capability, and we will illustrate these by way of the specific examples described.

It will be seen that the control program 73, described in detail in FIG. 8 acts in concert with DIS capsule execution.

The DIS capsule is an object program with executable additions which we have created to interact with the control program. It should be also understood that the DIS capsule object can perform programmable functions on data which is retrieved from databases. Not only can a DIS capsule get data, it can combine, reformat, and update, the data retrieved. It can act on the data to create new data and basically act as a dedicated processor processing data gathered or created during a Web browser request to output the end result to the user under programmable parameters determined by the creator of the DIS capsule, as they may be selected, if desired, by the user as part of the request. Thus the user entered inputs as part of his request, either free form or by selection of variables in the menus afforded to the user as illustrated by way of example in FIG. 5.

DIS capsule objects are like some other objects. For instance in Microsoft's products, an example being the Excel (trademark of Microsoft) spreadsheet, one can click on an object portrayed on the screen and link a succession of objects to perform a specific function, such as take data from a spreadsheet and reformat it into a variety of selectable formats, such as text or graphic illustration. The kind of action to be taken is illustrated by an object on the screen, and linking of routines is done by a succession of clicks on icons representing the object.

In accordance with our preferred embodiment, a DIS capsule is used to invoke system resources. This is done by providing a list of commands, which may be those provided by a DIS processor itself, or written in Visual Basic or C by the programmer. The result is a command file, like an exec or command file in OS/2 or like a *.BAT file in DOS. These capsules perform the specific functions that are requested by the user from his initiation session. The user further qualifies the execution of the DIS capsule by providing parameters which are used in the invocation.

Now the DIS server 133 supports DIS, the program processor which supports DIS capsules by processing commands contained in the DIS capsule, either directly, in the case of DIS functions, or by to other system or user supplied functions. The user supplied functions comprise mainly those DIS functions which are supplied by DIS and illustrated in the manual "Developing Applications with Open-DIS Access Service, Version 2.0 of the OPEN Access Service." For those not familiar with command files, this manual is fully incorporated herein by this reference as available at the USPTO. An example of a system supplied function would be the base support for SQL queries of a specific database, which are invoked by the DIS capsule program.

In illustrating the specific examples of our invention illustrated in FIGS. 9 and 10, both illustrate linked objects according to a specified flow sequence within a DIS environment. The DIS environment contains numerous functions, including the Internetwork routing functions which the DIS capsules can invoke. Thus, a DIS object which queries a database, as illustrated, invokes the Internetwork routing functions to query databases where they are located on the network. If the preferred example of DIS environment is not supplied, a similar environment with program environment means which supports reaching a destination on the Internet by a link between systems which routes data from one physical unit to another according to the applicable protocol should be supplied. The protocol will employ a URL address for Internet locations.

FIG. 9 illustrates by way of example a DIS capsule that creates a text report file. Referring to FIG. 9, it will be seen that the capsule, represented by a series of linked objects, is supported by Internetwork processor support environment means 90. Within this environment an integrated capsule creates a text report file as a result of the object 95, make text. This object result file is the file 43 according to FIG. 3 which is displayed at the browser. In the illustrated example, the multiple DIS capsule data retrieval command file 91(a) . . . 91(n) initiates as a first step multiple queries to different databases which are specified by the parameters of the request. In this example, multiple queries are initiates as SQL type search requests as multiple steps 91(a) . . . 91(n) executed by the DIS capsule server 133 with the Database Gateway 134 to select data from DB26000 databases located inside the intranet 140 and on the Internet by Internetwork routing to database gateway 134' and its DB26000 databases by step 91(a). The data is stored in a DIS declared buffer. Similarly, in parallel or successively, additional steps 91(b), 91(c), 91(d), and 91(n) retrieve data and store in their object buffer data retrieved from Sybase, Oracle, Redbrick, and IBM's Data Warehouse databases. Thus object 91(a) will query DB26000 and bring data back to DIS. Object 91(b) will query Oracle and bring data back to DIS. Object 91(c) will query Sybase and bring data back to DIS. Object 91(d) (shown as a dot in FIG. 9) will query Redbrick and bring data back to DIS, and so on. The nth object 91(n) will query IBM's data warehouse and bring data back to DIS. In a subsequent linked processing step 92 data from the database queries in the first step is joined by joining object command file 92 and stored in a buffer related to this object. Object 92 will join the data from the n locations searched in step 91. Thereafter, in a subsequent processing step performed by calculation object command file 93 on the joined data in the joined database result buffer of step 92, desired calculations performed in accordance with the parameters indicated by the request are done on the joined data. Thereafter, in accordance with the request parameters text is formatted to space delimited text by the format object command file 94. The results are stored in a buffer associated with format object command file 94. Thereafter, a make text command file 95 causes the formatted text to be created as a text file for the WWW server 131 to be stored in a file which is accessible to and can be retrieved and displayed by the control program agent 73, or directly displayed by the control program agent 73 in the form illustrated in FIG. 4 at the Web browser 130. It will be noted we have illustrated this process as object capsules in a DIS internetworking environment. These object capsules are a specialized form of a command file, which can encompass additional commands called by an object.

Preferred Embodiment of Graphics DIS Capsule

FIG. 10 illustrates by way of example a DIS capsule that creates a graphical report file. For simplicity, data in this FIGURE is also shown in a DIS environment 90. Retrieval object command file 101 illustrates a step of retrieval of data from one or more databases as specified in the parameters of the request, performing these retrieval steps as did retrieval object command files 91(a) . . . 91(n). Thereafter, this data is plotted with the make plot object command file 102, with the results being stored in a buffer. The final step of creating a result-to-be-presented file, in this instance in the form of a bitmap ready for display to a Web browser 130 is created by the make bitmap (BMP) object command file 103. The example of a preferred bitmap object command which would be employed with todays Internet environment is a GIF image. Others can be used as well. Again the results are provided to the Web browser 130, by the action of the program command agent 73 on the Web Server 131, the results being illustrated by the pie-chart of FIG. 6 in accordance with the parameters of the request for generating the graphical report illustrated by FIG. 6.

Alternative Preferred Embodiments

FIG. 11 illustrates an alternative configuration of the network system as it may be employed for permitting access to information available through homepages and in data warehouses where access to the homepage or database may or may not be restricted by a firewall. In FIG. 11, the web browser(s) 130 accesses an associated Web Server 131, 131', 131" either by a coupling or addressing with a uniform resource locator (URL) the Web Server 131 which may be selected with a Hyperlink. This can be a direct coupling or an indirect coupling, as via a node locatable in a common access medium, such as provided by Internet resources accessible via a web browser, e.g. supporting Web Explorer, or Mosaic, NetScape, node 131 located somewhere on the Internet which utilizes our control program agent 73. Now node 131 which functions as a Web server is coupled via a token-ring network, SNA network, or other suitable network 132 (one of the any which may be used on the Internet as a transmission medium) with the facilities provided within what we will call our intranet, those facilities which are "proprietary" to the owner and which may be protected by firewalls at the intranet boundary 140. Now note that our control program 73 is resident within the Web Server 131 and functions as described in FIG. 8 to couple to a DIS server 133 located within the intranet 140, which is preferably located behind a firewall as indicated in FIG. 11. This DIS Server 133 is in turn coupled to our Database gateway 134. This database gateway is configured as illustrated also in FIG. 1 for gathering information from databases coupled to it and located on servers for DB2, Oracle, Sybase, and Redbrick, as well as one for information warehouse functions. In our preferred embodiments these database units are IBM mainframe systems, as available commercially today, but they could be AS400s, RISC/6000, RISC/6000 SP or other systems supporting the databases.

The DIS Server is a server which supports DIS or similar decision support functions and the functions provided by our DIS capsules illustrated by FIG. 9 and 10.

Now our Web browsers 130 can not only access information within the intranet, but can reach outside the intranet to gather information located elsewhere via the Internet. We will describe two examples of our preferred couplings to elements on the Internet. One example couples the database gateway 134 to another (a second) database gateway 134' via the Internet and it Internetwork routing (INR) protocol available from IBM as part of its current DIS product which can make use of UALs. The second database gateway 134' is coupled to its own (second) DIS server 133'. At this point the Web browser 130 can access data not only intranet, but also via the Internet to gather data from a database supported by DIS server 133' located outside the intranet. The Database server 134' would be able to gather information from any database coupled to it, as illustrated, assuming access is public or accessible after processing of a hidden variable access authorization.

However,the web browser(s) 130 can also access via Web Server 131 (with our control program 73 illustrated in detail in FIG. 8) another Web server 131' which implements our control program 73. This Web server, for example, Web server 131' can also be coupled via its own (second) network 132' (which supports functions equivalent to network 132 and as illustrated in FIGS. 1 and 11) to an associated DIS Server 133' as illustrated to perform tasks like those we are describing from a request sent via the second network from its Web server 131'.

However, as another alternative example, Web server 131' with an appropriate API can access a directly coupled database available to the server, such as MicroSoft's Access 131a. Thus small databases which have not yet invested in being able to gather information from an intranet resource, can use their own direct resources, and also be interrogated by the Web browser(s) 130, or another web browser 136. Remember that browser's 130 can also communicate with the Web server 131' across the Internet, just as can a Web browser 136 located on the intranet 140 inside of the firewall illustrated by the intranet 140 dashed line shown in FIG. 11. With a browser 136 in place at the Web Server 131' location, that browser 136 can make requests, if authorized across the intranet to the Web Server 131 which can then utilize the DIS capsules provided by the DIS Server 133.

Physically, the network 132 will have its own access server 135 preferably in the form of a TCP/IP server 135 to make the physical connection across the Internet. We illustrate in FIG. 11 IC this other logical layer as located on the network. This TCP/IP server supports the physical connections which are needed by the other logical higher levels of service supported on the network. The use of an InterNetwork Routing Protocol (INR) allows the logical coupling illustrated between a application processing server 134 to an external intranet application processing server 134'. On each network there can be one or more web servers. A Hypertext document request asking for a field to be seached, as by a Hyperlink, could index to a server directly, e g. a second web server 134" on the same network which would have its own control program agent function duplicating the control program agent resident in web server 134. Thus at the request homepage a menu which say if "Art&Literature search", when selected in a Hyperlink setting, would index to a particular web server and a particular document within that web server's environment This web server 134" besides being linked to its own application processing server 133" has a direct link, in the environment illustrated, to an MVS CICS, a transaction processing server for handling transaction processing. Such a solution allows CICS transaction processing to utilize the Internet to save transmission costs and still be located beneath a firewall for retention of data integrity. The outputs provided by the web server to the requested destination can be outside of the firewall, and in the form of results illustrated by the possible examples shown in FIGS. 3, 5 and 8.

While we have described our preferred embodiments of our invention, it will be understood that those skilled in the art, both now and in the future, may make various improvements and enhancements which fall within the scope of the claims which follow. These claims should be construed to maintain the proper protection for the invention first disclosed.

What is claimed is:

1. A method for distributed task fulfillment of requests of a requesting web based agent with a command file agent tangibly embodying a program set of instructions executable by a supporting machine environment for performing required method steps and fulfilling the request by providing a result, said method steps comprising:

receiving at said command file agent a submit command from a control program agent in preparation for providing said result to pass to said command file agent as a command file variable for use in naming said result which will be created by said command file agent, which result said command file agent will create that result with a unique result name during execution of said command file agent, processing by said command file agent a series of linked objects according to a specified flow sequence within a distributed data environment specified by said command file agent, including executing functions specified in said command file agent including data retrieval and processing, and in the process storing the result of said processing as said unique named result during execution of said command file agent.

2. A method for distributed task fulfillment of requests of a requesting web based agent according to claim 1, further comprising:

invoking internetwork routing functions by said command file agent after authorization data is received during execution of a request submitted by said control program agent.

3. A method for distributed task fulfillment of requests of a requesting web based agent according to claim 1, further comprising:

receiving data originated by a web document's variables stored by said control program agent prior to creating a uniquely named result.

4. A method for distributed task fulfillment of requests of a requesting web based agent according to claim 1, further comprising:

invoking internetworkting routing functions to query databases where they are located on the network.

5. A method for distributed task fulfillment of requests of a requesting web based agent according to claim 1, further comprising:

invoking internetworking routing functions to query databases where they are located on the network by reaching a destination on the Internet by a link between systems and routing data retrieved from one physical unit to another according to an applicable protocol.

6. A method for distributed task fulfillment of requests of a requesting web based agent according to claim 1, further comprising:

invoking internetworkling routing functions to query databases where they are located on the network by reaching a destination on the Internet by a link between systems and routing data retrieved from one physical unit to another according to an applicable protocol, employing a URL address for Internet locations.

7. A method for distributed task fulfillment of requests of a requesting web based agent according to claim 1, wherein said control program acts in concert with said command file agent execution in fulfilling requests and any object programs with executable additions which have been created to interact with said control program agent when object icons are identified by a user of a web browser.

8. A method for distributed task fulfillment of requests off a requesting web based agent according to claim 1, wherein said command file agent performs programmable functions on data which is retrieved from databases.

9. A method for distributed task fulfillment of requests of a requesting web based agent according to claim 1, wherein said command file agent performs programmable functions on data which is retrieved from databases, and not only does a command file agent get data, it combines, reformats, and updates, the data retrieved.

10. A method for distributed task fulfillment of requests of a requesting web based agent according to claim 1, wherein said command file agent performs programmable functions on data which is retrieved from databases functioning as a dedicated processor processing data gathered or created during a Web browser request to output the end result to the user under programmable parameters determined by the creator of a command file agent, as may be selected, if desired, by the user as part of the request.

11. A method for distributed task fulfillment of requests of a requesting web based agent according to claim 1, wherein the user enters inputs as part of his request, either free form or by selection of variables in the menus afforded to the user.

12. A method for distributed task fulfillment of requests of a requesting web based agent according to claim 1, further comprising responding to a recorded click on a object icon portrayed on a user screen and linking command files represented by said icon to link said object as one of said series of linked objects to perform an indicated specified flow sequence specified by one or more icons.

13. A method for distributed task fulfillment of requests of a requesting web based agent according to claim 1, further comprising providing functions as by successive execution of a list of commands listed in a command file agent, including any calls to programs written in another language, to perform specific functions that are requested by the user from his initiation session.

14. A method for distributed task fulfillment of requests of a requesting web based agent according to claim 1, further comprising providing functions as by successive execution of a list of commands listed in a command file agent, including any calls to programs written in another language, to perform specific functions that are requested by the user from his initiation session, and wherein user further qualifies the execution of the command file by providing parameters which are used in the invocation of a command file.

15. A method for distributed task fulfillment of requests of a requesting web based agent according to claim 1, further comprising providing functions as by successive execution of a list of commands listed in a command file agent, including any calls to programs for SQL queries of a specific database, which are invoked by the command file.

16. A method for distributed task fulfillment of requests of a requesting web based agent according to claim 1, further comprising wherein a command file agent, represented by a series of linked objects, is supported by an internetwork processor support environment.

17. A method for distributed task fulfillment of requests of a requesting web based agent according to claim 1, further comprising within a decision interpretation system environment an integrated capsule creates a text report file as a result of a make text object.

18. A method for distributed task fulfillment of requests of a requesting web based agent according to claim 1, wherein within a decision interpretation system environment an integrated capsule creates a text report file as an object result file, which object result file is displayed at a web client terminal.

19. A method for distributed task fulfillment of requests of a requesting web based agent according to claim 1, wherein a multiple data retrieval command file agent (91(a) . . . 91(n)) initiates as a first step multiple queries to different databases which are specified by the parameters of the request.

20. A method for distributed task fulfillment of requests of a requesting web based agent according to claim 1, wherein a multiple data retrieval command file (91(a) . . . 91(n)) initiates as a first step multiple queries to different databases which are specified by the parameters of the request to initiate multiple queries as SQL search requests with as multiple steps (91(a) . . . 91(n)) executed by a command file agent server with a database gateway to select data from differing base databases located inside an intranet and on the Internet by internetwork routing to at least one other database gateway and its linked databases, and storing the retrieved date data in a buffer declared by the command file.

21. A method for distributed task fulfillment of requests of a requesting web based agent according to claim 1, including performing additional steps (91(b), 91(c), 91(d), and 91(n)) to retrieve data and store in their command file object buffer data retrieved from other base databases, each returning data back to a command file declared buffer, and in a subsequent linked processing step (92) data from the database queries in the preceding data retrieval steps is joined by joining according to an object command file and stored in a buffer related to this joining object command file.

22. A method for distributed task fulfillment of requests of a requesting web based agent according to claim 1, including in a subsequent processing step performed by calculation object command file agent (93) on joined data in a joined database result buffer (92) desired calculations are performed on joined data in accordance with the parameters indicated by the request.

23. A method for distributed task fulfillment of requests of a requesting web based agent according to claim 1, including in accordance with the request parameters text is formatted to space delimited text by a format object command file agent function (94), and storing the results in a buffer associated with a format object command file agent (94).

24. A method for distributed task fulfillment of requests of a requesting web based agent according to claim 1, including a make text command file agent causes the formatted text to be created as a text file for use via a WWW server (131) permitting said text file to be stored in a file which is accessible to and retrieved and displayed in the form requested an at the location determined by Web browser input parameters to a control program agent.

25. A method for distributed task fulfillment of requests of a requesting web based agent according to claim 1, including creating a graphical report file.

26. A method for distributed task fulfillment of requests of a requesting web based agent according to claim 1, including creating a graphical report file utilizing a retrieval object command file agent to retrieve data from one or more databases as specified in the parameters of the request.

27. A method for distributed task fulfillment of requests of a requesting web based agent according to claim 1, including utilizing a plot object command file agent to plot retrieved data with the results being stored in a buffer.

28. A method for distributed task fulfillment of requests of a requesting web based agent according to claim 1, including creating a result-to-be-presented file with a bitmap object command file agent a bitmap ready for display in a form and at a location determined by a request from a Web browser (130).

29. A method for distributed task fulfillment of requests of a requesting web based agent according to claim 1, wherein said command file agent performs programmable functions on data which is retrieved from databases, and not only does a command file agent get data, it combines, reformats, and updates, the data retrieved to create said result as a file.

30. A method for distributed task fulfillment of requests of a requesting web based agent according to claim 1, wherein said command file agent performs programmable functions on data which is retrieved from databases, and not only does a command file agent get data, it combines, reformats, and updates, the data retrieved to create said result as an object for representing a series of linked objects and is supported by an internetwork processor support environment.

31. A method for distributed task fulfillment of requests of a requesting web based agent according to claim 30, wherein the user enters inputs as part of his request, either free form or by selection of variables in the menus afforded to the user.

32. A method for distributed task fulfillment of requests of a requesting web based agent according to claim 30, further comprising responding to a recorded click on a object icon portrayed on a user screen and linking command files represented by said icon to link said object as one of said series of linked objects to perform an indicated specified flow sequence specified by one or more icons.

33. A method for distributed task fulfillment of requests of a requesting web based agent according to claim 30, further comprising providing functions as by successive execution of a list of commands listed in a command file agent, including any calls to programs written in another language, to perform specific functions that are requested by the user from his initiation session.

34. A method for distributed task fulfillment of requests of a requesting web based agent according to claim 30, further comprising providing functions as by successive execution of a list of commands listed in a command file agent, including any calls to programs written in another language, to perform specific functions that are requested by the user from his initiation session, and wherein user further qualifies the execution of the command file by providing parameters which are used in the invocation of a command file.

* * * * *